(12) United States Patent
Kawai

(10) Patent No.: US 8,054,364 B2
(45) Date of Patent: Nov. 8, 2011

(54) IMAGE APPARATUS AND DRIVE CONTROL METHOD FOR IMAGE PICKUP DEVICE WITH HORIZONTAL ADDITION OF PIXEL DATA

(75) Inventor: Tomoyuki Kawai, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 789 days.

(21) Appl. No.: 12/056,022

(22) Filed: Mar. 26, 2008

(65) Prior Publication Data

US 2008/0239128 A1    Oct. 2, 2008

(30) Foreign Application Priority Data

Mar. 27, 2007  (JP) .................................. 2007-081290

(51) Int. Cl.
*H04N 3/14* (2006.01)
*H04N 9/083* (2006.01)
(52) U.S. Cl. ........ 348/312; 348/280; 348/282; 348/321; 348/323
(58) Field of Classification Search .................. 348/312, 348/320, 322, 324
See application file for complete search history.

(56) References Cited

U.S. PATENT DOCUMENTS

| | | | | |
|---|---|---|---|---|
| 4,996,600 A * | 2/1991 | Nishida et al. | ................. | 348/322 |
| 5,309,240 A * | 5/1994 | Miwada | ................. | 348/311 |
| 5,587,576 A * | 12/1996 | Maki | ................. | 235/462.41 |
| 5,652,664 A * | 7/1997 | Kusaka et al. | ................. | 358/483 |
| 6,423,959 B1 * | 7/2002 | Ikeda et al. | ................. | 250/208.1 |
| 6,593,968 B1 * | 7/2003 | Ichikawa | ................. | 348/324 |
| 6,784,412 B2 * | 8/2004 | Hynecek | ................. | 250/208.1 |
| 7,002,630 B1 | 2/2006 | Iizuka et al. | | |
| 7,139,023 B2 * | 11/2006 | Hynecek | ................. | 348/303 |
| 7,184,085 B2 * | 2/2007 | Hakamata et al. | ............. | 348/311 |
| 7,420,605 B2 * | 9/2008 | Pool et al. | ................. | 348/311 |
| 7,605,411 B2 * | 10/2009 | Shiraki et al. | ................. | 257/232 |
| 7,760,261 B2 * | 7/2010 | Kobayashi | ................. | 348/311 |
| 7,889,259 B2 * | 2/2011 | Furuta et al. | ................. | 348/311 |
| 2003/0169355 A1 | 9/2003 | Kubo | | |
| 2005/0122413 A1 * | 6/2005 | Matsuyama | ................. | 348/272 |
| 2006/0092304 A1 | 5/2006 | Hirota | | |
| 2007/0115380 A1 * | 5/2007 | Shibata et al. | ................. | 348/311 |

FOREIGN PATENT DOCUMENTS

| | | |
|---|---|---|
| JP | 5-41835 A | 2/1993 |
| JP | 6-78101 A | 3/1994 |
| JP | 2000-50289 A | 2/2000 |
| JP | 2001-309394 A | 11/2001 |
| JP | 2002-112119 A | 4/2002 |
| JP | 2006-33129 A | 2/2006 |

* cited by examiner

*Primary Examiner* — Ngoc-Yen Vu
(74) *Attorney, Agent, or Firm* — Birch, Stewart, Kolasch & Birch, LLP

(57) ABSTRACT

A drive control method for an image pickup device is disclosed. The image pickup device includes two-dimensionally arranged light receiving elements to photoelectrically convert incoming light, vertical transfer paths to transfer charges, which have been generated through the photoelectric conversion by the light receiving elements, in the vertical direction, and a horizontal transfer path to transfer the charges, which have been transferred by the vertical transfer path, row by row in the horizontal direction. In the method, the charges, which have been horizontally transferred by the horizontal transfer path, are directed and outputted in more than one directions, and the directed charges are respectively transferred and are added by temporarily stopping the transfer of the charges.

18 Claims, 9 Drawing Sheets

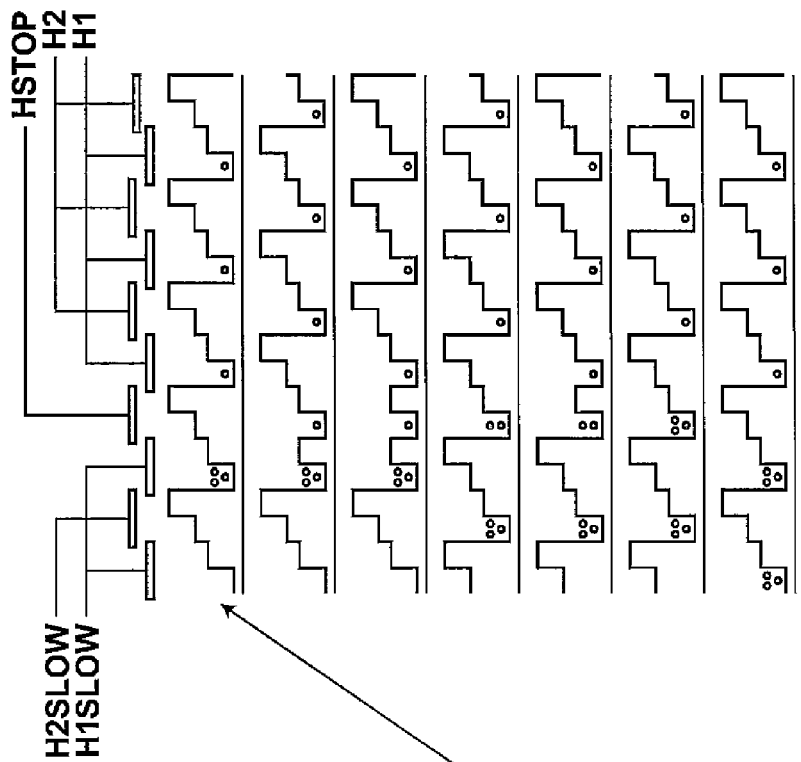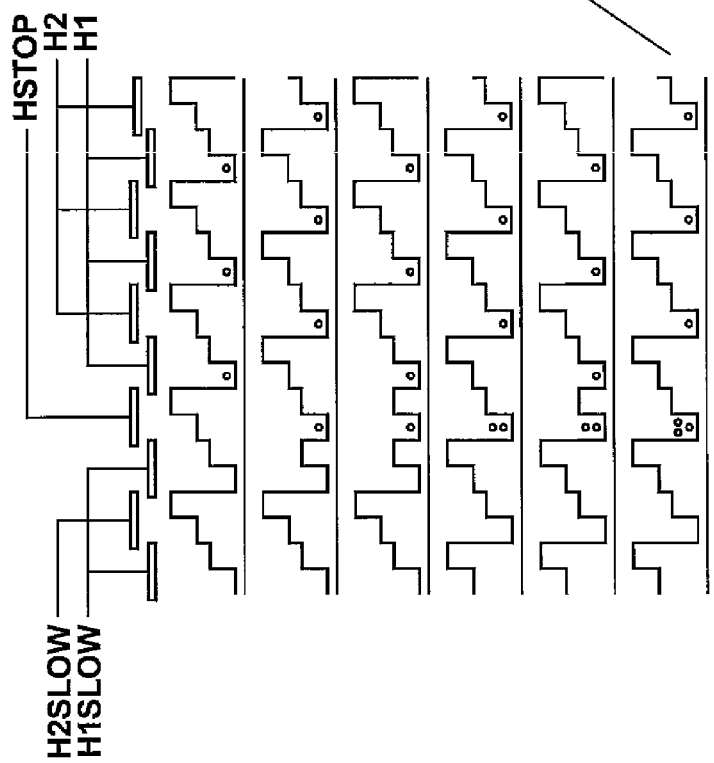
FIG.7

IMAGE APPARATUS AND DRIVE CONTROL METHOD FOR IMAGE PICKUP DEVICE WITH HORIZONTAL ADDITION OF PIXEL DATA

BACKGROUND OF THE INVENTION

1. Field of the Invention

The present invention relates to an imaging apparatus provided with an image pickup device such as a CCD, and a drive control method for an image pickup device.

2. Description of the Related Art

Conventionally, a CCD (charge-coupled device) has widely been used as an image pickup device in imaging apparatuses such as digital still cameras. The CCD has light receiving elements such as photodiodes, each light receiving element stores a charge corresponding to an amount of received light, and the stored charges are read out through vertical transfer paths and a horizontal transfer path.

In the above-described type CCD, horizontal pixel addition has been achieved, for example, by temporarily stopping horizontal transfer to add adjacent pixels (see, for example, Japanese Unexamined Patent Publication No. 6 (1994)-078101), by providing a transfer path serving as a buffer between the vertical transfer paths and the horizontal transfer path (see, for example, U.S. Pat. No. 7,002,630), or by providing a line memory and gradually driving the horizontal transfer path during blanking periods of vertical transfer (see, for example, U.S. Patent Application Publication No. 20030169355 and Japanese Unexamined Patent Publication No. 2002-112119).

However, there is a problem in the conventional horizontal pixel addition schemes that only horizontally adjacent pixels can be added, and if the horizontally adjacent pixels have different colors, the colors are mixed. On the other hand, in CCDs that are designed to prevent mixing of colors, the number of added pixels in the horizontal direction and a positional relationship between added pixels are fixed, and there is little flexibility in outputted images. Further, such CCDs necessitate a complicated driving method to achieve the horizontal addition.

SUMMARY OF THE INVENTION

In view of the above-described circumstances, the present invention is directed to providing an imaging apparatus and a drive control method for an image pickup device in which the horizontal addition can be carried out without causing mixing of colors, and the number of added pixels in the horizontal direction and a positional relationship between added pixels can be freely set.

An aspect of the imaging apparatus of the invention includes: an image pickup device including two-dimensionally arranged light receiving elements to photoelectrically convert incoming light, vertical transfer paths to transfer charges, which have been generated through the photoelectric conversion by the light receiving elements, in the vertical direction, a horizontal transfer path to transfer the charges, which have been transferred by the vertical transfer path, row by row in the horizontal direction, a separating section to direct and output the charges, which have been horizontally transferred by the horizontal transfer path, in more than one directions, and buffering sections to respectively transfer the charges directed by the separating section and add the charges by temporarily stopping the transfer of the charges; and a drive control section to temporarily stop the transfer of the charges at the buffering section according to the number of charges to be added at the buffering section.

In the imaging apparatus of the invention, the image pickup device may include a horizontal transfer section to transfer the charge, which has been added at the buffering section, at a drive frequency according to the number of added charges, and an output section to amplify the charge transferred by the horizontal transfer section to output the amplified charge, and the drive control section may drive the horizontal transfer section and the output section at the drive frequency.

The image pickup device may include a Bayer pattern color filter array, and the separating section may direct and output the horizontally transferred charges in two directions.

The light receiving elements may be arranged in a honeycomb-like pattern, in which positions of the light receiving elements of adjacent lines are offset from each other by half a pitch in both the row direction and the column direction.

The image pickup device may include a honeycomb pattern color filter array, and the separating section may direct and output the horizontally transferred charges in two directions.

The image pickup device may include a lateral overflow drain provided at the horizontal transfer path before the separating section.

The image pickup device may include lateral overflow drains respectively provided at the buffering sections after the separating section.

An aspect of the drive control method for an image pickup device of the invention is a drive control method for an image pickup device including two-dimensionally arranged light receiving elements to photoelectrically convert incoming light, vertical transfer paths to transfer charges, which have been generated through the photoelectric conversion by the light receiving elements, in the vertical direction, and a horizontal transfer path to transfer the charges, which have been transferred by the vertical transfer path, row by row in the horizontal direction. The method includes: directing and outputting the charges, which have been horizontally transferred by the horizontal transfer path, in more than one directions; and respectively transferring the directed charges and adding the charges by temporarily stopping the transfer of the charges.

In the drive control method for an image pickup device, the image pickup device may include a horizontal transfer section to transfer the charge, which has been added at the buffering section, at a drive frequency according to the number of added charges, and an output section to amplify the charge transferred by the horizontal transfer section to output the amplified charge, and the horizontal transfer section and the output section may be driven at the drive frequency.

The image pickup device may include a Bayer pattern color filter array, and the horizontally transferred charges may be directed and outputted in two directions.

The light receiving elements may be arranged in a honeycomb-like pattern, in which positions of the light receiving elements of adjacent lines are offset from each other by half a pitch in both the row direction and the column direction.

The image pickup device may include a honeycomb pattern color filter array, and the horizontally transferred charges may be directed and outputted in two directions.

BRIEF DESCRIPTION OF THE DRAWINGS

FIG. 7 is a potential diagram in a case where charges of three pixels are added.

DESCRIPTION OF THE PREFERRED EMBODIMENTS

Figure 1:
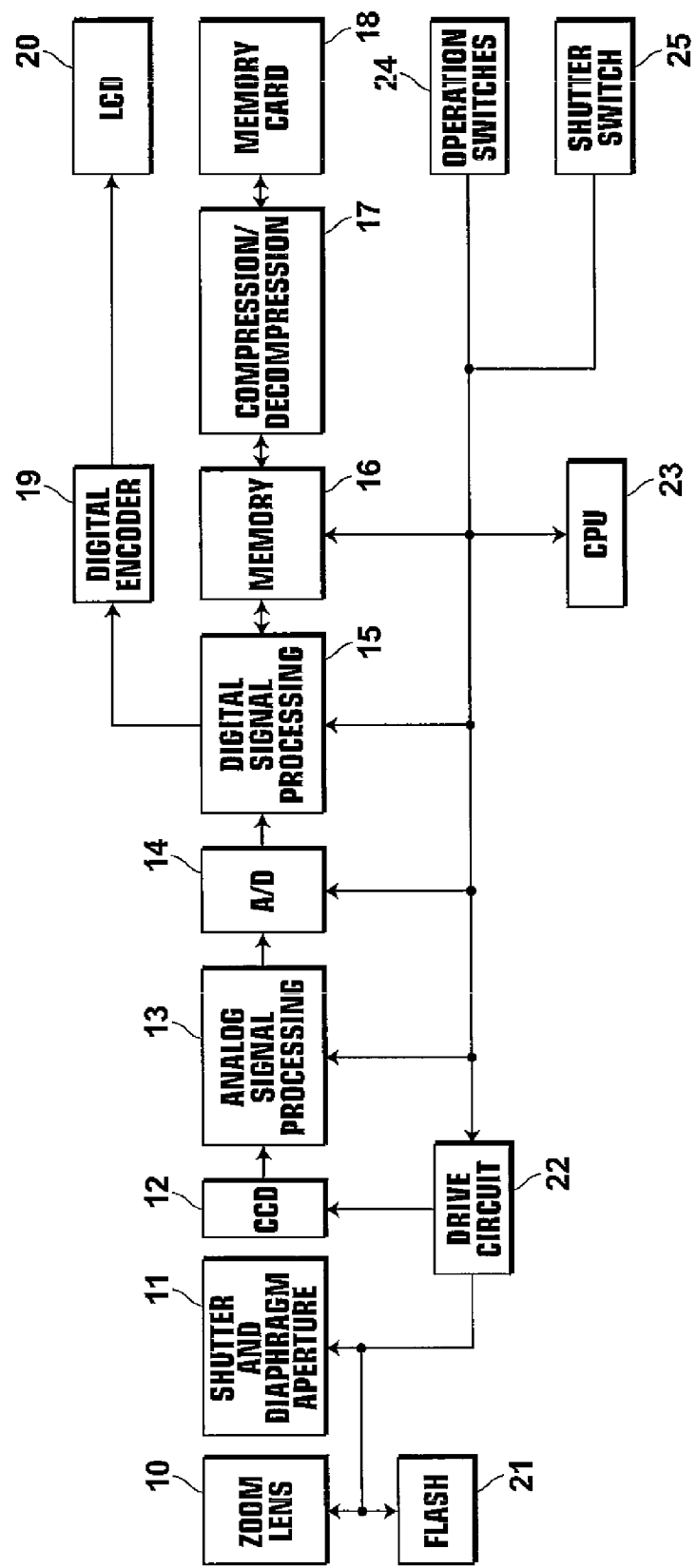
FIG. 1 is a block diagram illustrating the electrical configuration of a digital camera, to which one embodiment of an imaging apparatus of the present invention is applied.
Figure 2:
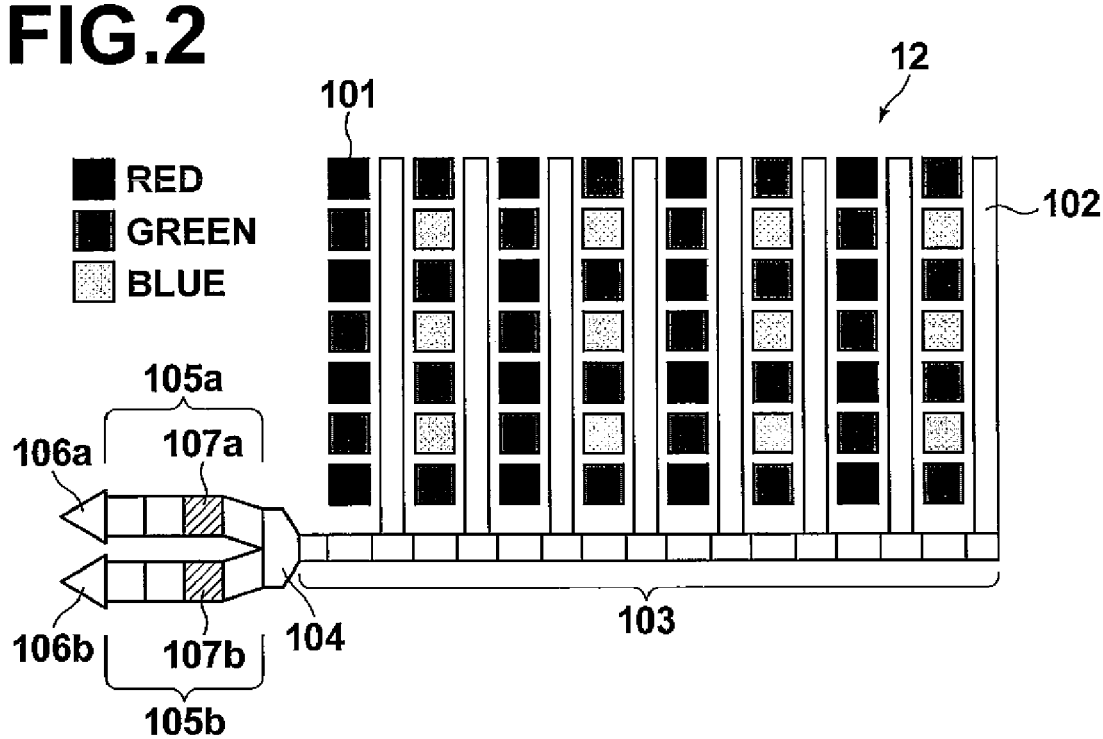
FIG. 2 is a diagram illustrating the schematic configuration of a CCD in the digital camera shown in FIG. 1.

Hereinafter, a digital camera employing one embodiment of an imaging apparatus of the present invention will be described with reference to the drawings. FIG. 1 is a block diagram illustrating the electrical configuration of the digital camera. FIG. 2 illustrates a schematic configuration of a CCD 12 in the digital camera. First, the CCD 12, which forms a feature of the invention, will be described.

As shown in FIG. 2, the CCD 12 includes: two-dimensionally arranged photodiodes 101 that photoelectrically convert incoming light; vertical transfer paths 102 that transfer charges, which are generated through the photoelectric conversion by the photodiodes 101, in the vertical direction; a horizontal transfer path 103 that transfers the charges, which have been transferred by the vertical transfer paths 102, row by row in the horizontal direction; a separating section 104 that directs and outputs the charges, which have been horizontally transferred by the horizontal transfer path 103, in two directions; two buffering sections 105a and 105b that respectively transfer the charges directed by the separating section 104 and add the charges by temporarily stopping the transfer of the charges; and amplifiers 106a and 106b that amplify charge signals, disposed at the ends of the buffering sections 105a and 105b.

As shown in FIG. 2, light receiving areas of the photodiodes 101 have red filters that transmit the red component of light, blue filters that transmit the blue component of light and green filters that transmit the green component of light disposed thereon in the Bayer pattern.

The buffering sections 105a and 105b includes pixel addition buffers 107a and 107b that temporarily stop the transfer of charges and add the charges.

Next, operation of the CCD 12 will be described.

As light enters the CCD 12, the light is received by the photodiodes 101 and photoelectrically converted. The charges generated through the photoelectric conversion by the photodiodes 101 are swept out to the vertical transfer paths 102 in response to a drive signal supplied from a drive circuit 22. The charges swept out to the vertical transfer paths 102 are transferred row by row to the horizontal transfer path 103. Then, the charges transferred to the horizontal transfer path 103 are transferred one by one to the separating section 104 in response to a drive signal supplied from the drive circuit 22.

Now, how the charges, which have been transferred to the horizontal transfer path 103, are transferred row by row in the horizontal direction is explained. A-Z in FIG. 3 illustrate a process of transferring charges of a row one by one to the amplifier 16.

Figure 3:
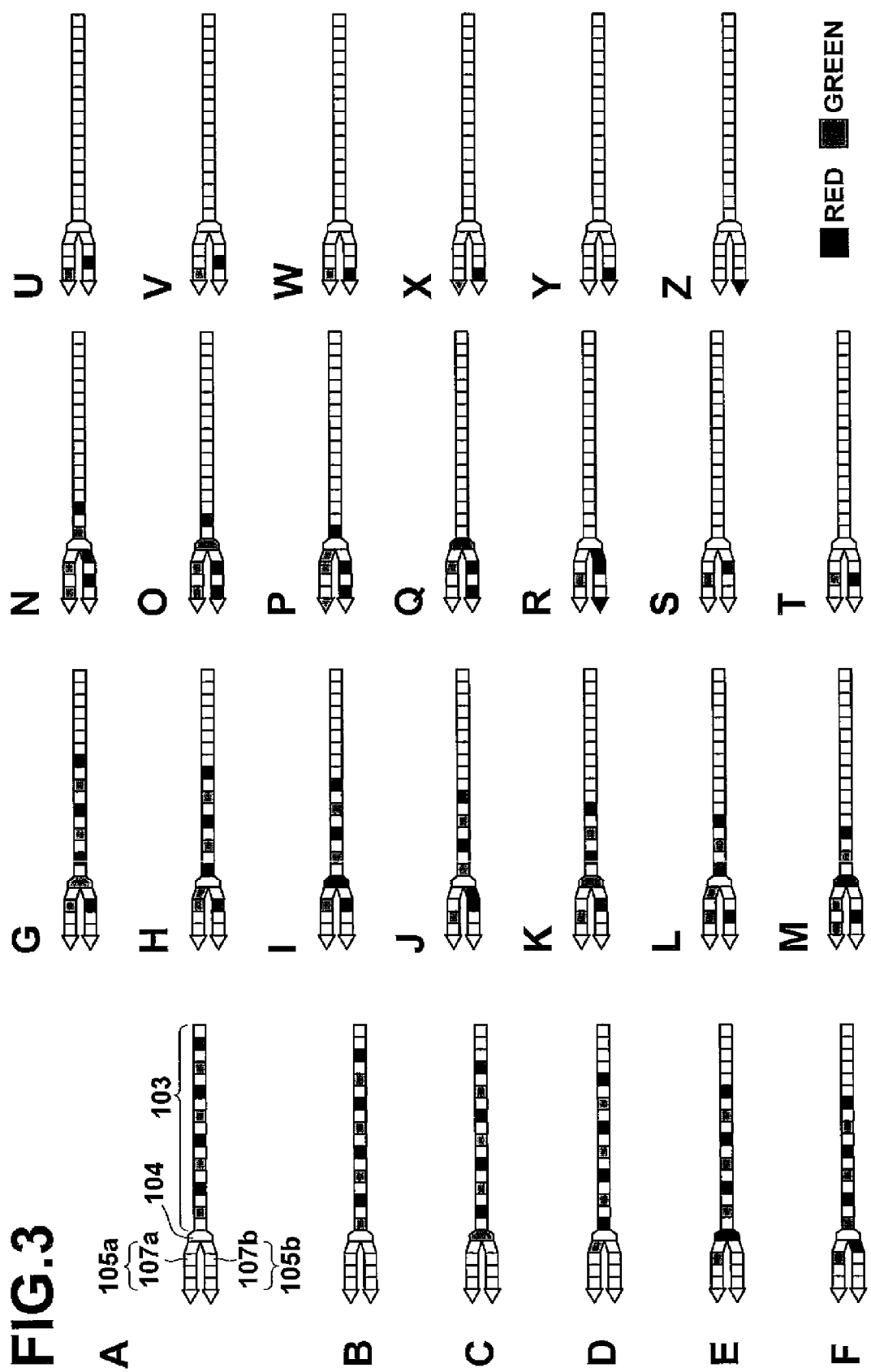
FIG. 3 is a diagram illustrating a process of transferring charges of a row one by one.

As shown at A in FIG. 3, first, charges of a row where green filters and red filters are alternately arranged in the horizontal direction are transferred to the horizontal transfer path 103. Then, as shown at A to C in FIG. 3, the charges of the row are transferred one by one to the separating section 104. As shown at D in FIG. 3, the green filter charge transferred to the separating section 104 is then transferred to one of the buffering sections, i.e., the buffering section 105a. As shown at F in FIG. 3, the red filter charge transferred to the separating section 104 is then transferred to the other buffering section 105b. When the green filter charge comes to the pixel addition buffer 107a, the transfer of the green filter charge is temporarily stopped at the pixel addition buffer 107a. Similarly, when the red filter charge comes to the pixel addition buffer 107b, the transfer of the red filter charge is temporarily stopped at the pixel addition buffer 107b. Then, as shown at G to I in FIG. 3, when the second green filter charge passes through the separating section 104 and comes to the pixel addition buffer 107a, the first green filter charge temporarily stopped at the pixel addition buffer 107a is added to the second green filter charge. Then, the added charge is transferred to the amplifier 106a. Similarly, when the second red filter charge passes through the separating section 104 and comes to the pixel addition buffer 107b, the first red filter charge temporarily stopped at the pixel addition buffer 107b is added to the second red filter charge. Then, the added charge is transferred to the amplifier 106b.

Similarly, the subsequent green filter charges are sequentially transferred to the buffering section 105a via the separating section 104, and the subsequent red filter charges are sequentially transferred to the buffer 105b via the separating section 104. Then, the suspension of transfer and the addition of two green filter charges are sequentially carried out at the pixel addition buffer 107a in the buffering section 105a, and the suspension of transfer and the addition of two red filter charges are sequentially carried out at the pixel addition buffer 107b in the buffering section 105b, as described above. Then, each charge generated by adding the two green filter charges is amplified at the amplifier 106a and is outputted, and each charge generated by adding the two red filter charges is amplified at the amplifier 106b and is outputted.

In this manner, charges of one row are transferred to add charges of two pixels for each color. It should be noted that, although the charges are directed in two directions at the separating section 104 in the above explanation, the separating section may direct the charges in three directions, for example, so that the addition of charge signals can be carried out for each of the three colors.

Figure 4:
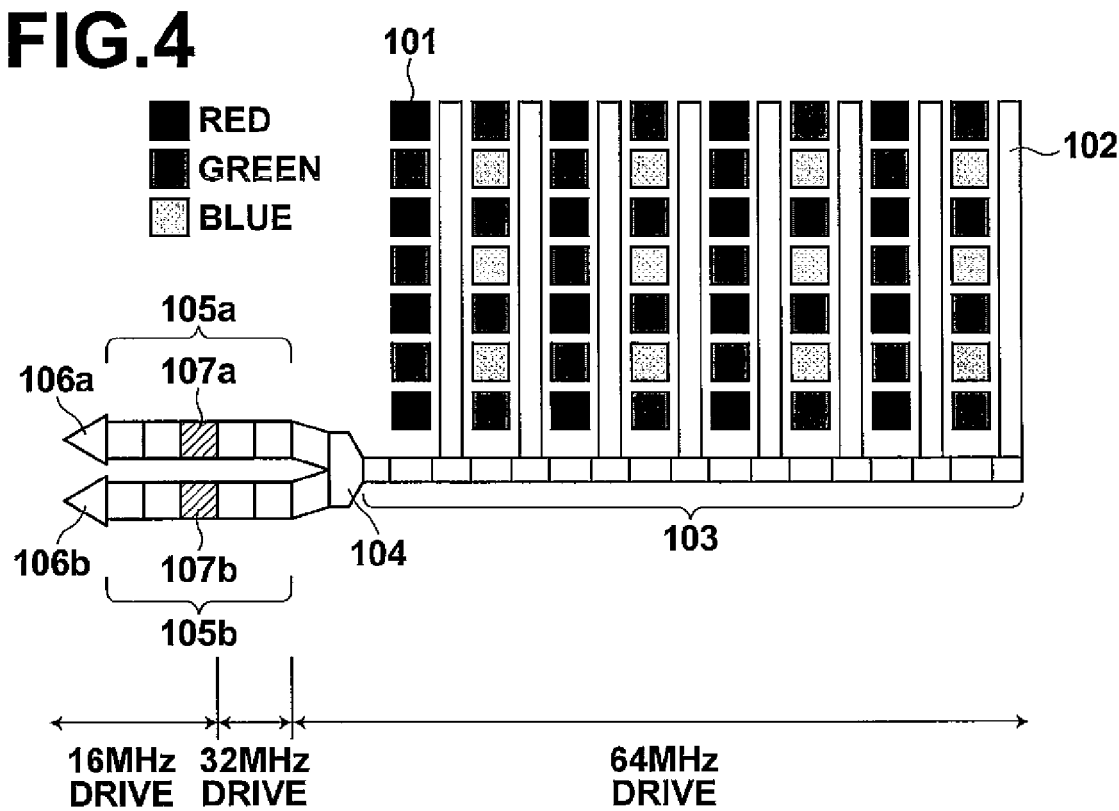
FIG. 4 is a diagram illustrating drive frequencies for respective sections of the CCD.

As shown in FIG. 4, in a case where charges of one row are transferred as described above with driving the horizontal transfer path 103 at a drive frequency of 64 MHz, portions of the buffering sections 105a and 105b between the separating section 104 and the pixel addition buffers 107a and 107b can be driven at a drive frequency of 32 MHz, which is a half of the drive frequency for the horizontal transfer path 103. Further, in a case where charges of two pixels are added at the pixel addition buffers 107a and 107b, portions of the buffering sections 105a and 105b between the pixel addition buffers 107a and 107b and the amplifiers 106a and 106b, and the amplifiers 106a and 106b can be driven at a drive frequency of 16 MHz, which is a further half of the above drive frequency. By changing the drive frequencies as described above, the amplifiers 106a and 106b can be driven at the low drive frequency even when reading is carried out at the high speed as 64 MHz, thereby achieving low noise at the amplifiers.

Figure 5:
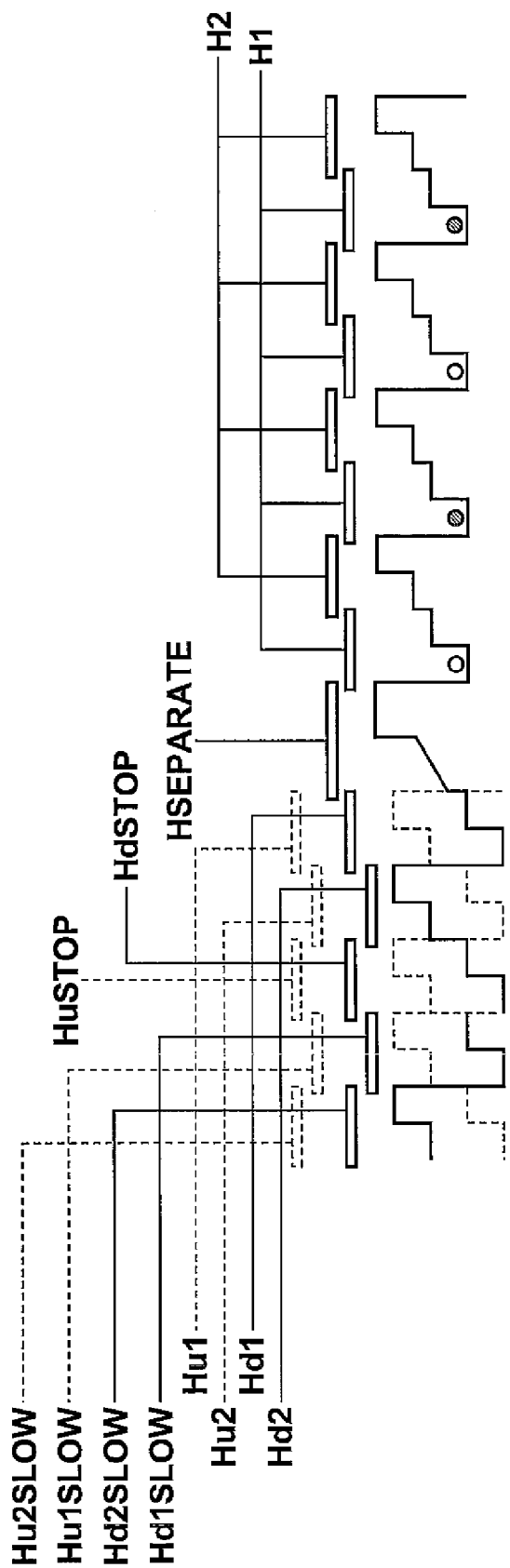
FIG. 5 is a potential diagram illustrating potentials at a horizontal transfer path, a separating section and buffering sections of the CCD.

FIG. 5 is a potential diagram for a case where the horizontal transfer path 103 and the buffering sections 105a and 105b are driven at the above-described drive frequencies. H1 and H2 are electrodes for driving the horizontal transfer path 103, HSEPARATE is an electrode for driving the separating section 104, Hu1 and Hu2 are electrodes for driving the portion of the buffering section 105a between the separating section 104 and the pixel addition buffer 107a, Hd1 and Hd2 are electrodes for driving the portion of the buffering section 105b between the separating section 104 and the pixel addition buffer 107b, HuSTOP is an electrode for driving the pixel addition buffer 107a, HdSTOP is an electrode for driving the pixel addition buffer 107b, Hu1SLOW and Hu2SLOW are electrodes for driving the portion of the buffering section 105a between the pixel addition buffer 107a and the amplifier 106a, and Hd1SLOW and Hd2SLOW are electrodes for driving the portion of the buffering section 105b between the pixel addition buffer 107b and the amplifier 106b.

Figure 6:
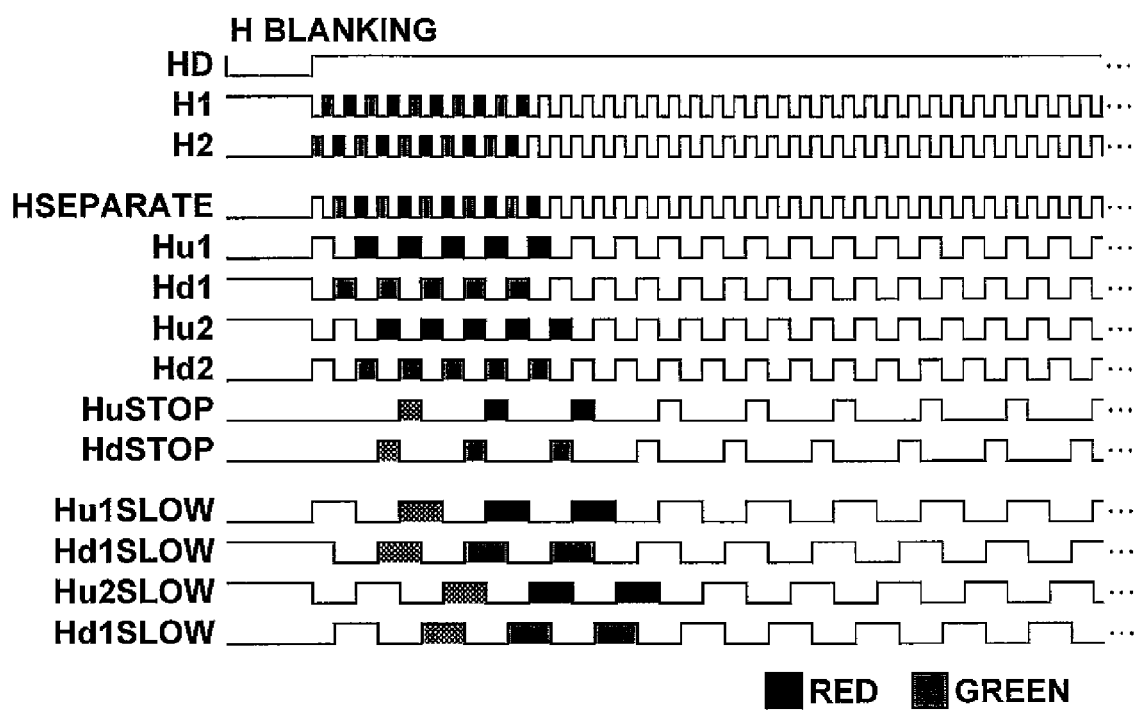
FIG. 6 is a timing chart illustrating timings of drive signals for driving the CCD.

FIG. 6 is a timing chart of drive signals for driving the electrodes shown in FIG. 5. As an example, timings and corresponding positions of charges of red and green pixels are shown. at the HSEPARATE of the separating section 104, each pixel is directed to one of the two buffering sections 105a and 105b (Hu/Hd), and then charges of two pixels are added at the HuSTOP and the HdSTOP. The drive signals as shown in FIG. 6 are outputted from the drive circuit 22.

Although the driving method described in the above explanation is to add charges of two pixels, charges of three pixels can be added by driving, i.e., changing the potential in a different pattern, as shown in FIG. 7. Similarly, addition of four pixels, five pixels, . . . , or N pixels can be achieved.

Figure 8:
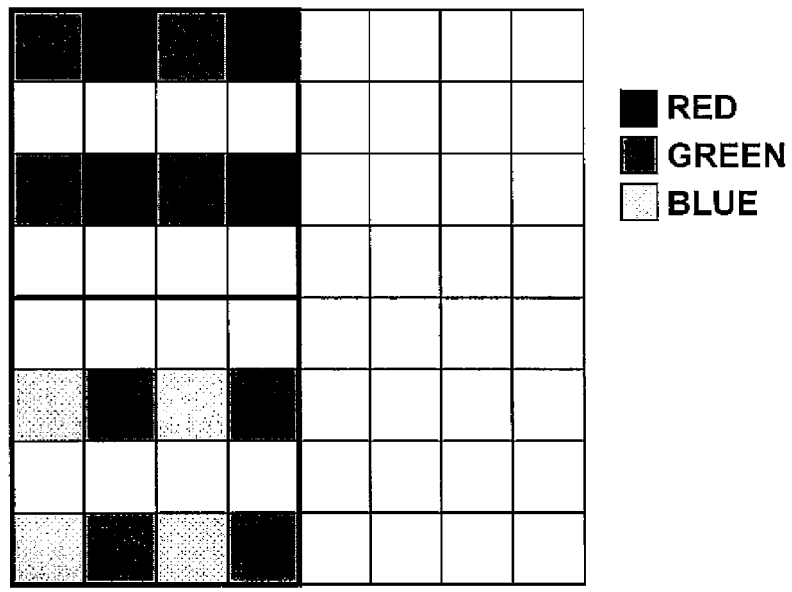
FIG. 8 is a diagram illustrating pixels in a case where two-pixel addition is carried out with sequentially reading one pixel out of every two pixels in the vertical direction, and two-pixel addition is carried out in the horizontal direction.

Further, the charges of pixels may be added not only in the horizontal direction but also in the vertical direction. If two-pixel addition is carried out with sequentially reading one pixel out of every two pixels (i.e., pixels of the same color) in the vertical direction, then, two-pixel addition may be carried out with directing the charges in two directions in the horizontal direction to achieve the pixel addition with maintaining the balance between a resolution in the horizontal direction and a resolution in the vertical direction, as shown in the areas surrounded by bold lines in FIG. 8.

Figure 9:
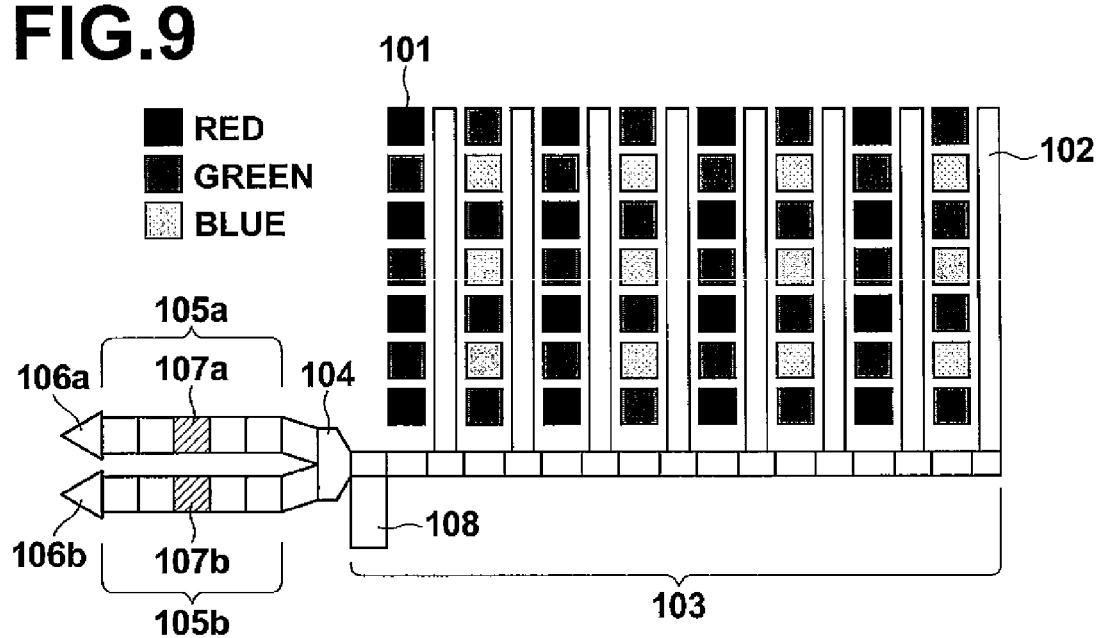
FIG. 9 is a diagram illustrating one example of a lateral overflow drain provided in the CCD.

When the charges of pixels are added as described above, the added charge may exceed a charge saturation capacity of the buffering sections 105a and 105b. Therefore, as shown in FIG. 9, a lateral overflow drain 108 may be provided at the horizontal transfer path 103 before the separating section 104.

Figure 10:
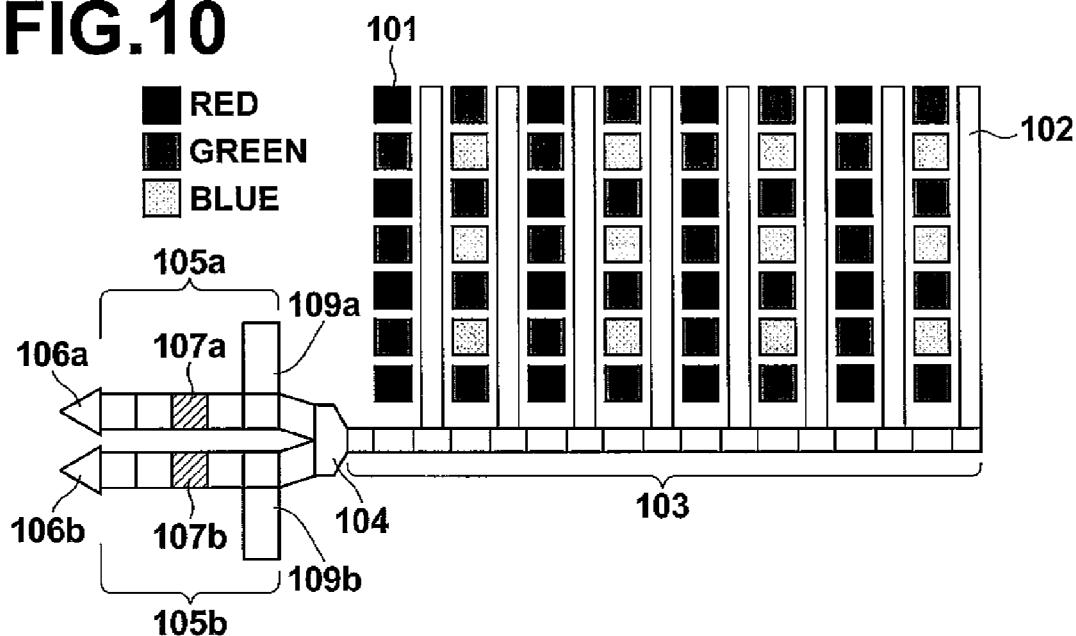
FIG. 10 is a diagram illustrating one example of lateral overflow drains provided in the CCD.

Alternatively, as shown in FIG. 10, lateral overflow drains 109a and 109b may respectively be provided at the buffering sections 105a and 105b after the separating section 104 and before the pixel addition buffers 107a and 107b.

Figure 11:
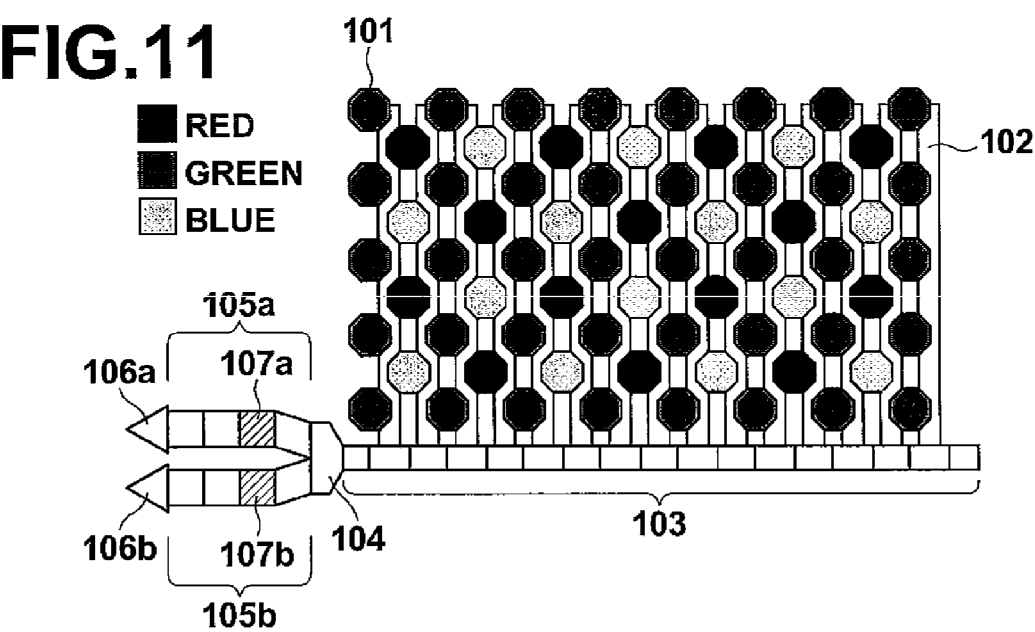
FIG. 11 is a diagram illustrating a CCD provided with a honeycomb pattern color filter array.

Although the above explanation is made in conjunction with the CCD having the Bayer pattern color filter array, a CCD having a honeycomb pattern color filter array, as shown in FIG. 11, can also be driven in the similar manner as described above. In the CCD shown in FIG. 11, the photodiodes 101 are arranged in a honeycomb-like pattern, in which positions of the photodiodes 101 of adjacent lines are offset from each other by half a pitch in both the row direction and the column direction. In the CCD having the honeycomb pattern color filter array, charges of a row of green filters, charges of a row of blue and red filters which are alternately arranged in this order or a row of red and blue filters which are alternately arranged in this order are read out. In a case where charges of the row of green filters are directed by the separating section 104 in to directions and added, charges of each combination of pixels having a "skipping" positional relationship can be added.

Next, operation of the digital camera provided with the above-described CCD 12 will be described.

The overall operation of the digital camera is controlled by a CPU 23.

The digital camera includes the drive circuit 22. The drive circuit 22 generates signals for driving the vertical transfer paths 102, the horizontal transfer path 103, the separating section 104, the buffering sections 105a and 105b, the pixel addition buffers 107a and 107b and the amplifiers 106a and 106b, and supplies the signals to the CCD 12. Other clock pulses are also generated by the drive circuit 22 and are supplied to respective circuits.

The digital camera further includes operation switches 24 including a mode setting switch, and the like. A signal from the operation switches 24 and a signal from a shutter switch 25 are inputted to the CPU 23.

The digital camera further includes a flash 21 for flash photographing.

The CCD 12 used in the digital camera is as described above.

In a photographing mode, a subject image is focused on the light receiving areas of the CCD 12 by a zoom lens 10 via a shutter and a diaphragm aperture 11. Then, charge signals are generated at the CCD 12 through the pixel addition as described above, and the charge signals are inputted to an analog signal processing circuit 13. The analog signal processing circuit 13 applies predetermined analog signal processing to the charge signals, and the charge signals are converted into digital image data at an analog/digital conversion circuit 14.

The digital image data is subjected to predetermined digital signal processing at a digital signal processing circuit 15, and the image data outputted from the digital signal processing circuit 15 is supplied to a LCD 20 via a digital encoder 19 to visibly display the subject image.

When the shutter switch 25 is pressed, RGB image data outputted from the digital signal processing circuit 15 is temporarily stored in the memory 16. Then, the RGB image data is read out from the memory 16 and inputted to a compression/decompression circuit 17 to be compressed. The compressed image data is stored in a memory card 18.

When a playback mode is set via one of the operation switches 24, the compressed image data stored in the memory card 18 is read out. The read out compressed image data is decompressed at the compression/decompression circuit 17. Then, the decompressed image data is supplied to the LCD 20 via the memory 16, the digital signal processing circuit 15 and the digital encoder, and an image represented by the image data stored in the memory card 18 is displayed.

According to the imaging apparatus and the drive control method for an image pickup device of the invention, the charges horizontally transferred by the horizontal transfer path of the image pickup device are directed and outputted in more than one directions, and the directed charges are respectively transferred and added by temporarily stopping the transfer of the charges. Therefore, if there are two colors of pixel data on the horizontal transfer path, for example, the pixel data for the respective colors are directed to separate transfer paths so that the pixel data for each color are added by temporarily stopping the transfer. Further, the number of added pixels in the horizontal direction and a positional relationship between added pixels can be freely set.

In a case where the horizontal transfer section and the output section are driven at a drive frequency according to the number of added charges in the imaging apparatus and the drive control method for an image pickup device of the invention, a lower drive frequency can be used depending on the number of added pixels, thereby reducing noise occurring at the output section.

In a case where the image pickup device includes a Bayer pattern color filter array and the horizontally transferred charges are directed and outputted in two directions, horizontal addition of any number of pixels can be achieved in the image pickup device having the Bayer pattern color filter array.

In a case where the image pickup device includes a honeycomb pattern color filter array and the horizontally transferred charges are directed and outputted in two directions, horizontal addition of any number of pixels can be achieved in the image pickup device having the honeycomb pattern color filter array.

In a case where a lateral overflow drain is provided at the horizontal transfer path before the separating section, blooming due to an added charge exceeding the charge saturation capacity of the buffering section can be prevented.

In a case where lateral overflow drains are respectively provided at the buffering sections after the separating section, blooming due to an added charge exceeding the charge saturation capacity of the buffering section can be prevented.

What is claimed is:

1. An imaging apparatus comprising:
    an image pickup device comprising
        two-dimensionally arranged light receiving elements to photoelectrically convert incoming light,
        vertical transfer paths to transfer charges from pixel units, which have been generated through the photoelectric conversion by the light receiving elements, in the vertical direction,
        a horizontal transfer path to transfer the charges from the pixel units, which have been transferred by the vertical transfer path, row by row in the horizontal direction,
        a separating section to sequentially direct and output the charges from different pixel units in more than one direction, after said charges from different pixel units have been horizontally transferred to the horizontal transfer path, and
        buffering sections to respectively transfer the charges directed by the separating section and add the charges by temporarily stopping the transfer of the charges; and
    a drive control section to temporarily stop the transfer of the charges at the buffering section according to the number of charges to be added at the buffering section,
    wherein, for a buffering section, different portions of the buffering section are driven at different frequencies.

2. The imaging apparatus as claimed in claim 1, wherein
the image pickup device comprises a horizontal transfer section to transfer the charge, which has been added at the buffering section, at a drive frequency according to the number of added charges, and an output section to amplify the charge transferred by the horizontal transfer section to output the amplified charge, and
the drive control section drives the horizontal transfer section and the output section at the drive frequency.

3. The imaging apparatus as claimed in claim 2, wherein
the image pickup device comprises a Bayer pattern color filter array, and
the separating section directs and outputs the horizontally transferred charges in two directions.

4. The imaging apparatus as claimed in claim 2, wherein
the light receiving elements are arranged in a honeycomb-like pattern, in which positions of the light receiving elements of adjacent lines are offset from each other by half a pitch in both the row direction and the column direction.

5. The imaging apparatus as claimed in claim 4, wherein
the image pickup device comprises a honeycomb pattern color filter array, and
the separating section directs and outputs the horizontally transferred charges in two directions.

6. The imaging apparatus as claimed in claim 1, wherein
the image pickup device comprises a Bayer pattern color filter array, and
the separating section directs and outputs the horizontally transferred charges in two directions.

7. The imaging apparatus as claimed in claim 1, wherein
the light receiving elements are arranged in a honeycomb-like pattern, in which positions of the light receiving elements of adjacent lines are offset from each other by half a pitch in both the row direction and the column direction.

8. The imaging apparatus as claimed in claim 7, wherein
the image pickup device comprises a honeycomb pattern color filter array, and
the separating section directs and outputs the horizontally transferred charges in two directions.

9. The imaging apparatus as claimed in claim 1, wherein
the image pickup device comprises a lateral overflow drain provided at the horizontal transfer path before the separating section.

10. The imaging apparatus as claimed in claim 1, wherein
the image pickup device comprises lateral overflow drains respectively provided at the buffering sections after the separating section.

11. A drive control method for an image pickup device including two-dimensionally arranged light receiving elements to photoelectrically convert incoming light, vertical transfer paths to transfer charges from pixel units, which have been generated through the photoelectric conversion by the light receiving elements, in the vertical direction, and a horizontal transfer path to transfer the charges from the pixel units, which have been transferred by the vertical transfer path, row by row in the horizontal direction, the method comprising:
    sequentially directing and outputting the charges from different pixel units in more than one direction, after said charges from different pixel units have been horizontally transferred to the horizontal transfer path; and
    respectively transferring the directed charges and adding the charges by temporarily stopping the transfer of the charges,
    wherein the image pickup device comprises a horizontal transfer section, to transfer charges which have been sequentially directed and outputted, at a buffering section in which different portions of the buffering section are driven at different frequencies.

12. The drive control method for an image pickup device as claimed in claim 11, wherein
the image pickup device comprises a horizontal transfer section to transfer the charge, which has been added at a buffering section, at a drive frequency according to the number of added charges, and an output section to amplify the charge transferred by the horizontal transfer section to output the amplified charge, and the horizontal transfer section and the output section are driven at the drive frequency.

13. The drive control method for an image pickup device as claimed in claim 12, wherein the image pickup device comprises a Bayer pattern color filter array, and the horizontally transferred charges are directed and outputted in two directions.

14. The drive control method for an image pickup device as claimed in claim 12, wherein the light receiving elements are arranged in a honeycomb-like pattern, in which positions of the light receiving elements of adjacent lines are offset from each other by half a pitch in both the row direction and the column direction.

15. The drive control method for an image pickup device as claimed in claim 14, wherein the image pickup device comprises a honeycomb pattern color filter array, and the horizontally transferred charges are directed and outputted in two directions.

16. The drive control method for an image pickup device as claimed in claim 11, wherein the image pickup device comprises a Bayer pattern color filter array, and the horizontally transferred charges are directed and outputted in two directions.

17. The drive control method for an image pickup device as claimed in claim 11, wherein the light receiving elements are arranged in a honeycomb-like pattern, in which positions of the light receiving elements of adjacent lines are offset from each other by half a pitch in both the row direction and the column direction.

18. The drive control method for an image pickup device as claimed in claim 17, wherein the image pickup device comprises a honeycomb pattern color filter array, and the horizontally transferred charges are directed and outputted in two directions.

* * * * *